UNITED STATES PATENT OFFICE.

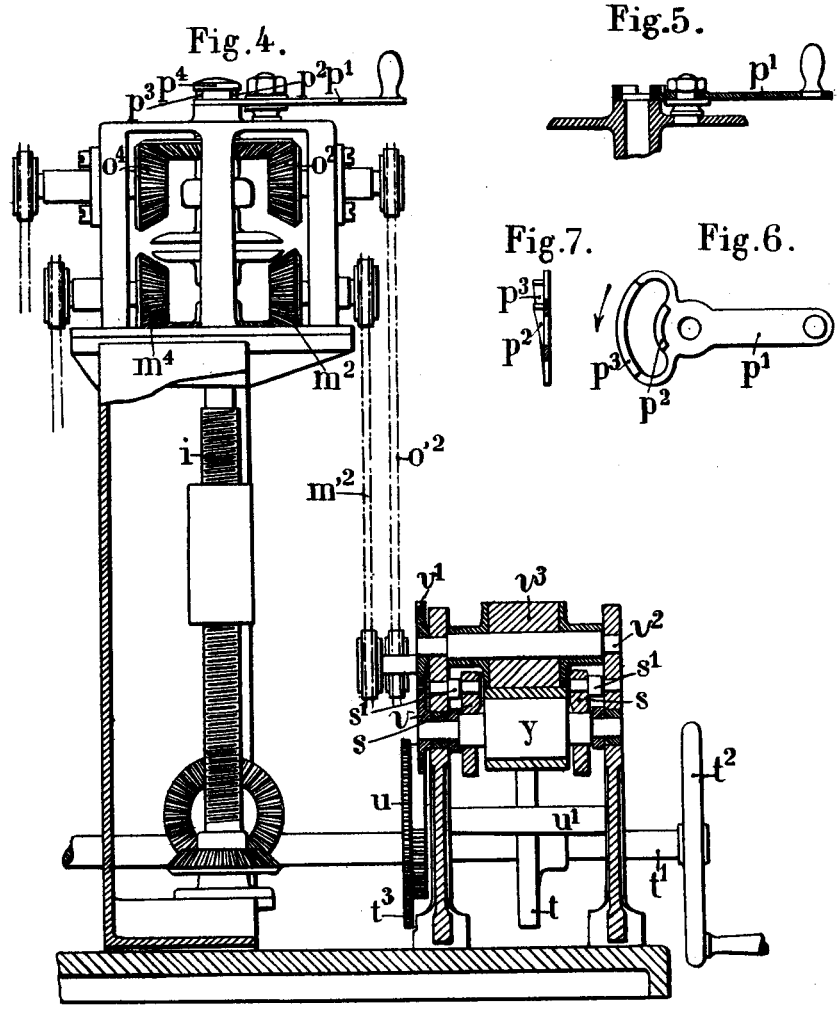

PIERRE VELTER, OF PARIS, FRANCE, ASSIGNOR TO SOCIÉTÉ INDUSTRIELLE D'INSTRUMENTS DE PRÉCISION, OF PARIS, FRANCE.

WEIGHING APPARATUS.

1,180,892. Specification of Letters Patent. Patented Apr. 25, 1916.

Application filed March 28, 1914, Serial No. 827,852. Renewed December 16, 1915. Serial No. 67,301.

*To all whom it may concern:*

Be it known that I, PIERRE VELTER, of 44 Avenue du Maine, in the city of Paris, Republic of France, have invented Improvements in Weighing Apparatus, of which the following is a full, clear, and exact description.

This invention relates to weighing apparatus in which the evaluation of the weights is obtained by measuring the tangents to the angles of inclination of the beam according to the principle set forth in Letters Patent of the United States No. 950528, patented March 1st, 1910.

The invention is characterized fundamentally by the fact that it is possible to read directly and at any moment both the gross weight and the net weight of the article without the necessity of knowing the weight of the tare or of making any calculations. To this end the screw which serves to measure the inclinations of the lever actuates two sets of gear-wheels or indicating drums, one of said sets being adapted to be connected to or disconnected from the screw. One of the sets of gear-wheels enables the gross weight to be determined and the other the net weights.

The invention is characterized also by the fact that the values of the net weights and of the gross weights being recorded by means of a recording mechanism hereinafter described, on the one hand on a ticket which is cut off after each weighing operation, and on the other hand on a check-strip which remains within the apparatus, the recording can only take place when the weighing machine is in the position of equilibrium, and during the recording operation the weighing device proper is locked in position.

The invention is illustrated in the annexed drawings wherein—

Figure 1:
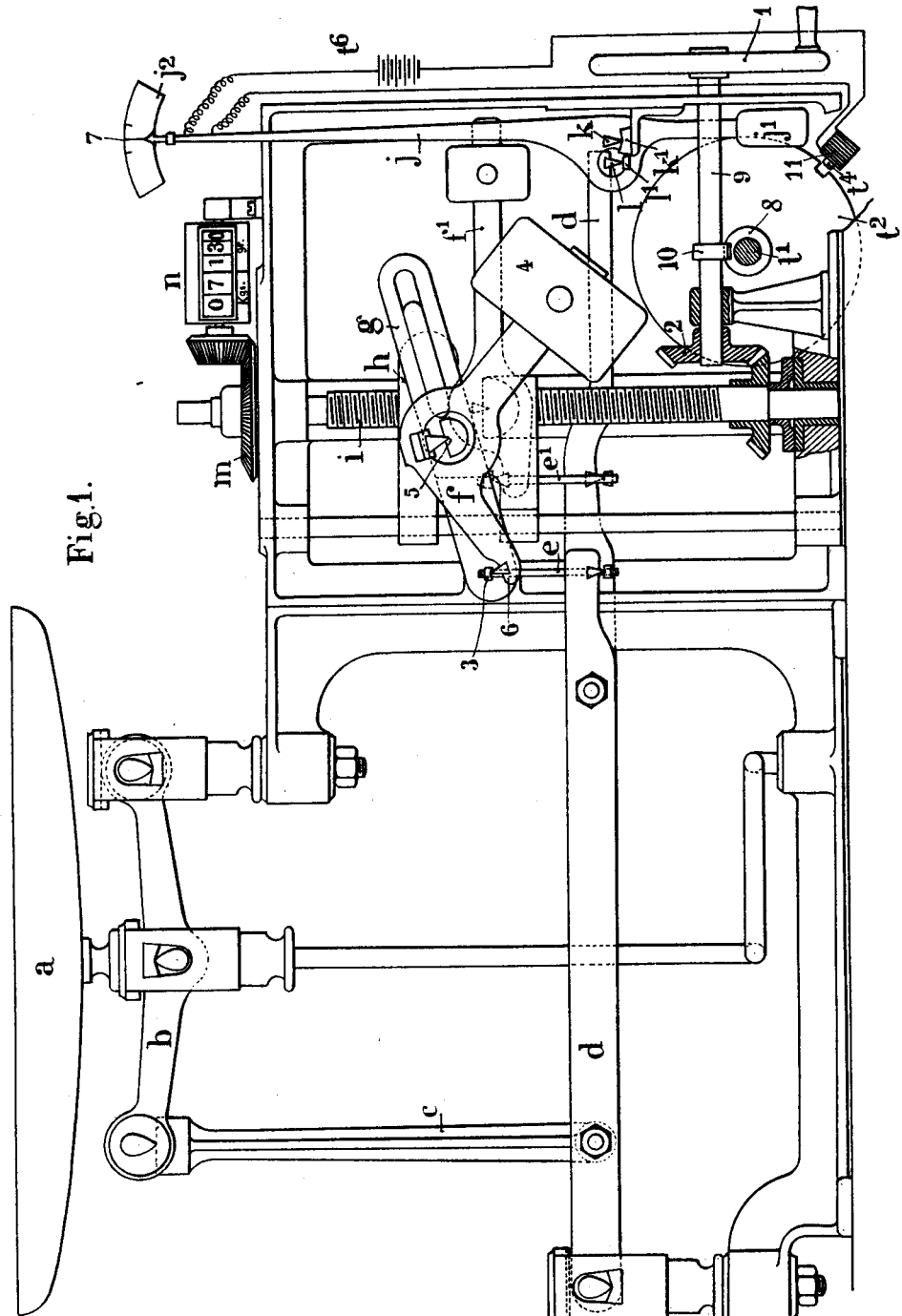
Figure 2:
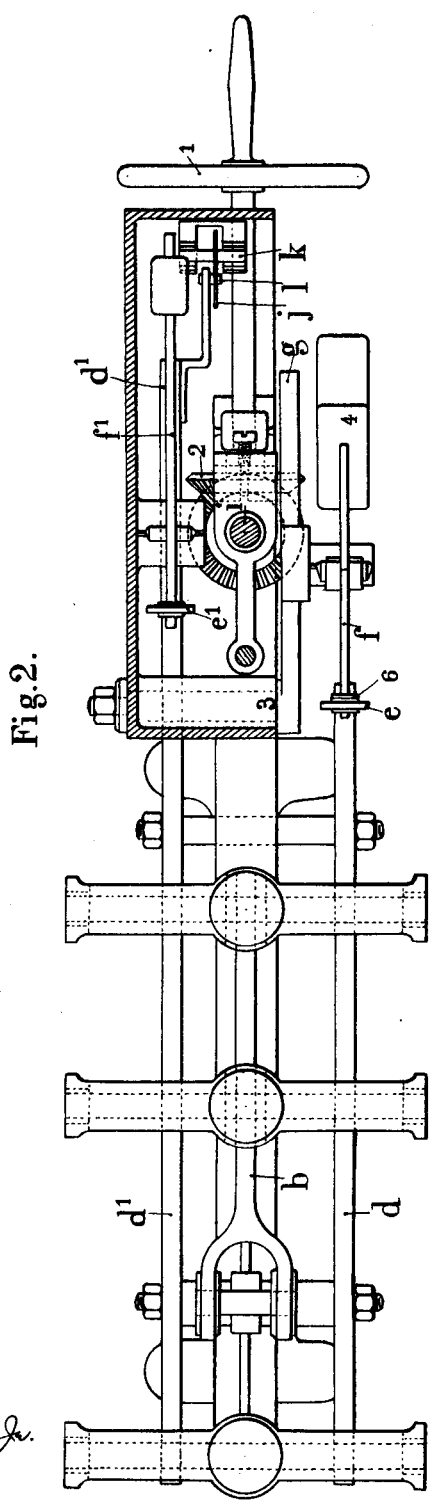
Figure 3:
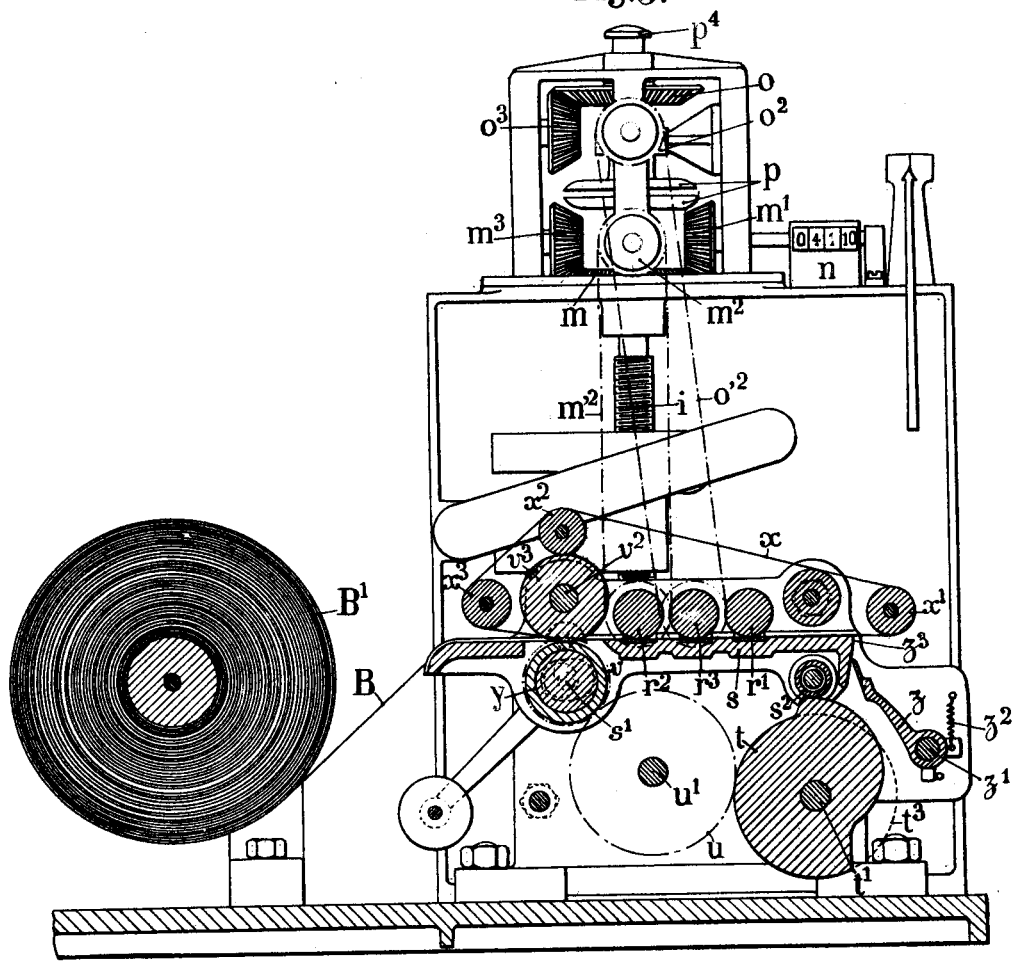

Figure 1 is an elevation of the machine and Fig. 2 a corresponding plan view with certain parts shown in section. Fig. 3 is a vertical section of the machine showing the ticket-printing mechanism. Fig. 4 is a vertical section in a plane perpendicular to that of the preceding figure. Figs. 5, 6 and 7 are detail views.

Referring to Figs. 1 and 2 of the drawings, $a$ is a scale-pan, $b$ a lever, $c$ a connecting rod, $d$ a lever connected by means of a stirrup $e$ to a so-called Conti beam $f$, and $g$ a lever whose inclination is adjusted at each weighing operation by means of a traveler $h$ actuated by means of a screw $i$; all these members being arranged in the manner described in Letters Patent of the United States No. 950528 patented March 1st 1910. The center of gravity of each lever $b$ and $d$ is situated on the line joining the knife-edges. The lever $d$ transmits its motion to an amplifying device consisting of a pointer $j$ having a counterweight $j^1$ and provided with a knife-edge $k$ resting on a stationary bearing $k^1$. The lever $d$ imparts motion to the pointer $j$ by means of a knife $l$ resting on a bearing $l^1$. The upper extremity of the pointer constitutes a hand which moves over the scale $j^2$. The lever $d$ is a double lever (Fig. 2) and composed of two bars $d$, $d^1$. One of the bars $d$ actuates the beam $f$ through the medium of the stirrup $e$ and the bar $d^1$ actuates the beam $f^1$ through the medium of the stirrup $e^1$. On the other hand the bar $d^1$ extends in a straight line and carries at its end the knife $l$.

On the upper extremity of the screw $i$ is keyed a bevel-wheel $m$ which engages a plurality of other bevel-pinions $m^1$, $m^2$, $m^3$ and $m^4$. The bevel-pinion $m^1$ drives the indicating drums $n$. The bevel-pinions $m^2$ and $m^4$ drive the printing rollers as hereinafter described. The pinion $m^3$ is simply situated at this place for imparting the movement to another indicating drum of any type (not illustrated.) $o$ is a second bevel-wheel mounted co-axially with reference to the wheel $m$ and serving to drive bevel-pinions $o^2$, $o^3$, $o^4$, the wheel $o$ being adapted to be driven by the screw $i$ when a friction-clutch $p$ is tightened up. This clutch is actuated by means of a crank $p^1$ provided with ramp-surfaces $p^2$ and $p^3$ which are clearly shown in Figs. 5 to 7. When the crank is rotated in the direction of the arrow in Fig. 6, the ramp-surfaces raise the head $p^4$ which engages the movable lower plate of the friction-clutch, thus causing the engagement of the wheel $o$ with the screw $i$. The head $p^4$ is, for instance, connected through a central spindle and a key to the lower plate. The pinions $m^1$ and $m^2$ are adapted to give at each moment indications of gross weights and the pinions $o^2$ and $o^4$ indications of net weights. The pinion $o^3$ imparts its motion to an indicating mechanism similar to $n$ (not illustrated) and on which appear the net weights.

In practice, assuming any kind of tare, for example a jar, to be placed in the pan of the scale, the screw $i$ is rotated by means of the crank 1, Fig. 1, and of the bevel-pinion 2. The nut $h$ moves upwardly upon the screw and draws along with it the lever $g$ by causing it to pivot about the fixed axis 3. The beam $f$ carried by this lever moves also upwardly. The torque due to the weight 4 relatively to the knife 5 increases, which determines the rising of the knife 6 and consequently of the levers $d$, $d^1$. At this moment the knife $l$, also rises, and the pointer $j$ moves in the front of the scale $j^2$; the movement of the crank 1 is arrested when the end of the pointer is opposite the index mark 7. Liquid is then poured into the jar and, after the pinions $o^2$, $o^3$ and $o^4$ have been clutched-up, the needle is again brought to its normal index mark. It is obvious that the pinions $m^1$, $m^2$, which have been actuated since the beginning of the weighing operation when the scale was at zero, will have transmitted, to the devices to which they are connected, indications of the total weight, that is to say, jar and liquid, while the pinions $o^2$, $o^3$, which have been actuated only after the liquid has been placed in the jar, will have given indications of the weight of the liquid alone which appear on a second group of indicating drums not illustrated.

On the annexed drawing the ticket-printing and distributing device is also shown; the check-strip printing device is arranged in a similar manner. The pinion $m^2$ is connected by means of a light chain $m'^2$ to a roller $r^2$ bearing a series of numerals. Similarly, the pinion $o^2$ actuates a similar roller $r^3$. Another roller or drum $r^1$ is intended to carry numerals, reference-symbols, or other suitable indications. The spindle of this drum passes through the box containing the mechanism and is provided on the outside with a handle by means of which it may be rotated so as to bring the indications required in front of the strip to be printed. This handle travels over a disk carrying indications corresponding with those of the drum. The strip B which is to be printed, is unwound from the spool $B^1$ and passes between the rollers $r^2$, $r^3$, $r^1$ and a lever $s$ rotating on pivotal bearings $s^1$ (Fig. 4). This lever carries a roller $s^2$ (Fig. 3) which rolls on a cam $t$ keyed on a spindle $t^1$ which is rotated by means of a hand-wheel $t^2$ (Fig. 4). On this spindle is also secured a toothed-wheel $t^3$ which engages with another wheel $u$ mounted on an intermediate shaft $u^1$. The wheel $u$ is provided, on part only of its circumference, with a second set of teeth adapted to come into engagement with a pinion $v$ which gears with a pinion $v^1$ secured to the spindle $v^2$ which carries a driving-roller $v^3$. A strip of carbon paper or inking tape $x$ passes over the tension rollers $x^1$, $x^2$, $x^3$. A roller $y$, eccentrically mounted, serves as a pressure roller for driving the ticket-strip B and the carbon strip $x$; this roller may carry an advertisement or an address. A knife $z$ serves for cutting off the ticket when printed. The knife is mounted on a carrier rotating about an axis $z^1$ and subjected to the action of a spring $z^2$; this spring presses the knife against the incline $z^3$. When the lever $s$ rocks downwardly the strip which moves therewith, abuts against the cutting blade and is cut.

The operation of the recording mechanism is as follows: When equilibrium has been established as hereinbefore set forth, the rollers $r^2$ and $r^3$ are set respectively to the net weight and the gross weight of the article and of its contents. The roller $r^1$ having been brought to the required reference, the hand-wheel $t^2$ is then rotated through one revolution. The cam $t$ raises the lever $s$, thus pressing the strip B against the printing rollers. The gear-wheels $t^3$, $u$, and $v$, cause the strip B to advance to an extent corresponding to the length of the ticket; then, at the end of the downward travel of the lever, the strip B comes up against the knife $z$ which cuts off the ticket. The ticket strip is supported by upper ledges on the lever $s$, said ledges serving as slides. The beam $j$ is provided with two electric contacts so arranged that when the index-needle of this beam is in registration with its index mark, that is to say, when the scale is in the position of equilibrium, an electric relay allows the rotation of the hand-wheel $t^2$. This relay consists simply in an electromagnet $t^5$, Fig. 1, intercalated in the circuit of a battery $t^6$; this electromagnet withdraws a bolt, fitting into a notch provided in the wheel $t^2$. On the other hand the spindle $t^1$ is provided, opposite the transverse spindle 9 which actuates the screw $i$, with a notched wheel 8 adapted to prevent any motion of the transverse spindle as soon as the shaft $t^1$ has begun to move, so that the weighing mechanism is locked during the time when the record is being made. The wheel 8 locks the spindle 9 by means of a second notched wheel 10 rigidly mounted on the spindle 9, Fig. 1. Under these conditions the recording can only take place when the weighing mechanism is in the position of equilibrium, and during the recording operation the weighing mechanism is locked in position.

The recording device for the check-strip is similar to the recording device for the tickets which has just been described. The rollers which correspond to $r^1$, $r^2$, $r^3$, are similarly driven but they are rotatably mounted on the same spindle. The knife is replaced by a winding-up spool. The check strip is also printed by the operation of the handle $t^2$ by means of the extension of the spindle $t^1$ illustrated on the left-hand side in Fig. 4.

Claims:

1. In a weighing recording apparatus, a lever whose displacement may be measured, a beam adapted to oscillate on said lever, a screw serving to modify the inclination of the lever, two series of gear wheels, one of which is permanently connected with said screw, means for connecting at will the other series with said screw, and recording devices controlled by said gear wheels.

2. In a weighing recording apparatus, a beam, a lever whose displacement may be measured, and on which the said beam is adapted to oscillate, a screw serving to modify the inclination of the lever, two series of gear wheels, one of which is permanently connected with said screw, a friction-clutch for connecting at will the other series with said screw, and recording devices controlled by said gear wheels.

3. In a weighing recording apparatus, a beam, a lever whose displacement may be measured and on which the said beam is adapted to oscillate, a screw serving to modify the inclination of the lever, two series of gear wheels, recording devices for gross weights and net weights controlled by said gear wheels, a printing roller actuated by the gear wheels of gross weights, and a printing roller actuated by the gear wheels of net weights.

4. In a weighing recording apparatus, a beam, a lever whose displacement may be measured and on which the said beam is adapted to oscillate, a screw serving to modify the inclination of the lever, two series of gear wheels, recording devices for gross weights and net weights, controlled by said gear wheels, a printing roller actuated by the gear wheels of gross weights, a printing roller actuated by the gear wheels of net weights, and means for pressing a ticket strip against said rollers.

5. In a weighing recording apparatus, a beam, a lever whose displacement may be measured and on which the said beam is adapted to oscillate, a screw serving to modify the inclination of the lever, two series of gear wheels, recording devices for gross weights and net weights controlled by said gear wheels, a printing roller actuated by the gear wheels of gross weights, a printing roller actuated by the gear wheels of net weights, and a rotating lever to press the ticket strip against the printing rollers.

6. In a weighing recording apparatus, a beam, a lever whose displacement may be measured and on which the said beam is adapted to oscillate, a screw serving to modify the inclination of the lever, two series of gear wheels, one of which is permanently connected with said screw, means for connecting at will the other series with said screw, recording devices controlled by said gear wheels, a printing mechanism, and means for locking the printing mechanism, before equilibrium.

7. In a weighing recording apparatus, a beam, a lever whose displacement may be measured and on which the said beam is adapted to oscillate, a screw serving to modify the inclination of the lever, two series of gear wheels, one of which is permanently connected with said screw means for connecting at will the other series with said screw, recording devices controlled by said gear wheels, a pointer, a printing mechanism having a hand wheel provided with a notch, an electric device, comprising a contact mounted on the pointer, a bolt, fitting into the notch of the hand wheel of the printing mechanism, and an electromagnet acting on said bolt.

8. In a weighing recording apparatus, a beam, a lever whose displacement may be measured and on which the said beam is adapted to oscillate, a screw serving to modify the inclination of the lever, two series of gear wheels, one of which is permanently connected with said screw, means for connecting at will the other series with said screw, recording devices controlled by said gear wheels, a printing mechanism, and means for locking the screw during the printing of the weight.

9. In a weighing recording apparatus, a beam, a lever whose displacement may be measured and on which the said beam is adapted to oscillate, a screw serving to modify the inclination of the lever, a hand wheel controlling the screw and having an axle, two series of gear wheels, one of which is permanently connected with said screw, means for connecting at will the other series with said screw, recording devices controlled by said gear wheels, a printing mechanism having a hand wheel provided with an axle, a notched wheel mounted on the axle of the hand wheel of the printing mechanism, and another notched wheel mounted on the axle of the hand wheel controlling the screw of the apparatus.

The foregoing specification of my improvements in weighing apparatus signed by me this 14th day of March, 1914.

PIERRE VELTER.

Witnesses:
CHAS. P. PRESSLY,
RENÉ THIRIOT.